United States Patent [19]

Tomozawa et al.

[11] Patent Number: 4,620,863

[45] Date of Patent: Nov. 4, 1986

[54] RADIATION COLORATION RESISTANT GLASS

[75] Inventors: Minoru Tomozawa; E. Bruce Watson; John Acocella, all of Troy, N.Y.

[73] Assignee: Rensselaer Polytechnic Institute, Troy, N.Y.

[21] Appl. No.: 542,219

[22] Filed: Oct. 14, 1983

Related U.S. Application Data

[63] Continuation of Ser. No. 279,701, Jul. 2, 1981, abandoned.

[51] Int. Cl.⁴ .............................................. C03C 23/00
[52] U.S. Cl. .................................... 65/30.12; 65/30.1; 65/62; 65/111; 250/492.1; 250/492.3
[58] Field of Search ................... 65/30.11, 30.12, 30.1, 65/62, 17, 111; 250/519.1, 515.1, 492.1, 492.3; 501/54, 55; 428/38; 204/157.1 H

[56] References Cited

U.S. PATENT DOCUMENTS

| | | | |
|---|---|---|---|
| 2,702,863 | 2/1955 | Koch | 204/157.1 H X |
| 2,721,941 | 10/1955 | McMaster et al. | 250/492.1 X |
| 2,858,441 | 10/1958 | Gale | 250/492.3 |
| 3,101,412 | 8/1963 | Maxwell | 250/492.1 X |
| 3,306,833 | 2/1967 | Leary | 204/157.1 H |
| 3,308,297 | 3/1967 | Mansker | 250/515.1 |
| 3,657,085 | 4/1972 | Hoffmeister et al. | 204/157.1 H X |
| 3,811,853 | 5/1974 | Bartholomew et al. | 65/30.12 X |
| 4,026,692 | 5/1977 | Bartholomew | 65/30.12 |
| 4,133,665 | 1/1979 | Bartholomew et al. | 65/30.72 X |
| 4,182,664 | 1/1980 | Maklad et al. | 204/157.1 H |
| 4,280,056 | 7/1981 | Renshaw | 250/515.1 |

Primary Examiner—Kenneth M. Schor
Attorney, Agent, or Firm—McGlew and Tuttle

[57] ABSTRACT

A radiation coloration resistant glass is disclosed which is used in a radiation environment sufficient to cause coloration in most forms of glass. The coloration resistant glass includes higher proportions by weight of water and has been found to be extremely resistant to color change when exposed to such radiation levels. The coloration resistant glass is free of cerium oxide and has more than about 0.5% by weight water content. Even when exposed to gamma radiation of more than $10^7$ rad, the coloration resistant glass does not lose transparency.

1 Claim, 3 Drawing Figures

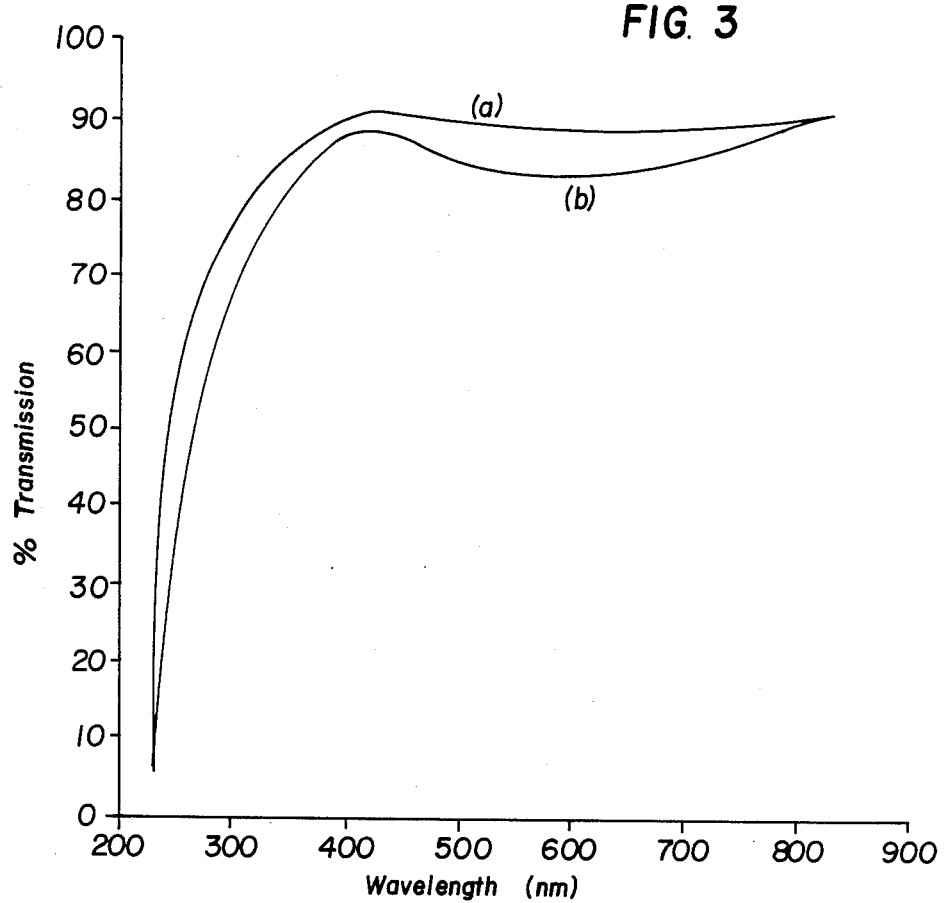

RADIATION COLORATION RESISTANT GLASS

This invention was made with government support under Government Contract/Grant no. DE-AC02-79ER10453 awarded by U.S. Department of Energy. The government has certain rights in this invention.

This is a continuation of application Ser. No. 279,701 filed July 2, 1981, and now abandoned.

FIELD AND BACKGROUND OF THE INVENTION

The present invention relates in general to glass and its use in a radiation environment. The glass is hydrated and has been found to be resistant to color change even after irradiation by gamma rays at more than $10^7$ rad.

Glass having high water content is known and exemplified for example in U.S. Pat. Nos. 4,073,654 and 4,098,596 to Wu.

It is also known to make transparent viewing windows from glass which contains cerium oxides. Such glasses are resistant to coloration after intense or prolonged exposures to radiation.

Studies have been made concerning the effect of radiation on glass and similar materials. These studies are exemplified by; S. P. Faile and D. M. Roy, "Mechanism of Color Center Destruction in Hydrogen Impregnated Radiation Resistant Glasses", *Mater Res. Bull.*, 5 6 385–89 (1970); and T. Yamamoto, S. Sakka, and M. Tashiro, "Effect of Pressure on Radiation Induced Color Centers in Silicate Glasses", *J. Non-Gryst. Solids*, 1 6 441–54 (1969).

It is accordingly known that most forms of glass turn brown or become less transparent when exposed to radiation. An object of the invention is to present a method and an arrangement whereby a transparent viewing window, made of a particular kind of glass, can be provided to view radiation sources or be provided in a potential radiation environment without suffering from the coloration problem.

SUMMARY OF THE INVENTION

The essence of the invention revolves around the observation and discovery that, certain types of glass having high water content are particularly resistant to coloration when exposed to levels of radiation higher than normal average ambient levels. Specifically it has been discovered that glass having a water content above about 0.5% by weight, and preferably above 2% by weight, are particularly resistant to electromagnetic radiation having wavelength less than about $10^{-7}$ cm. Such radiation generally includes X-rays and gamma rays. The glass is also resistant to $\beta$ (electron) radiation.

An object of the invention is to utilize such a composition of glass in an environment which exposes the glass to high levels of such radiation, and to thus provide a transparent viewing window in such an environment which is resistant to coloration.

Another object of the invention is to prevent the browning of a transparent glass in a radiation environment, comprising, preparing a transparent glass having at least about 0.5% by weight water, and positioning the glass in an environment of radiation sufficient to cause browning or coloration in glass having less than 0.5% by weight water content.

Another object of the invention is to prepare such glass without the use of cerium oxides.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

BRIEF DESCRIPTION OF THE DRAWINGS

In the drawings:

FIG. 3 is a graph similar to FIG. 2 showing the results where glass having a high water content, according to the invention, is used.

DESCRIPTION OF THE PREFERRED EMBODIMENTS

Figure 1:
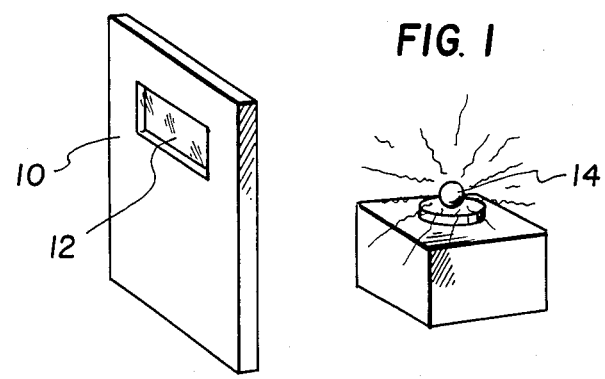
FIG. 1 is a stylized schematic view of a radiation shield or partition having a transparent viewing window for viewing a source of radiation or for positioning within a radiation environment.

Turning to the drawings in particular, the invention embodied therein, in FIG. 1, comprises a non-browning or coloration resistant glass 12 which can be used as a window, for example, in a shield or partition 10 for positioning withing a radioactive environment or, specifically for viewing a source of radiation 14.

The glass 12 has a relatively high water content, preferably above 2% by weight water. While it is known to use cerium oxide glass in a radioactive environment since such glass is resistant to coloration or browning, it has been found that the high water content glass according to the invention is even more coloration resistant. This is particulary advantageous due to the fact that cerium oxide glass is generally more expensive than more conventional types of glass made for example, of sodium oxide with silicon oxide or a sodium oxide, silicon oxide, aluminum oxide combination.

Figure 2:
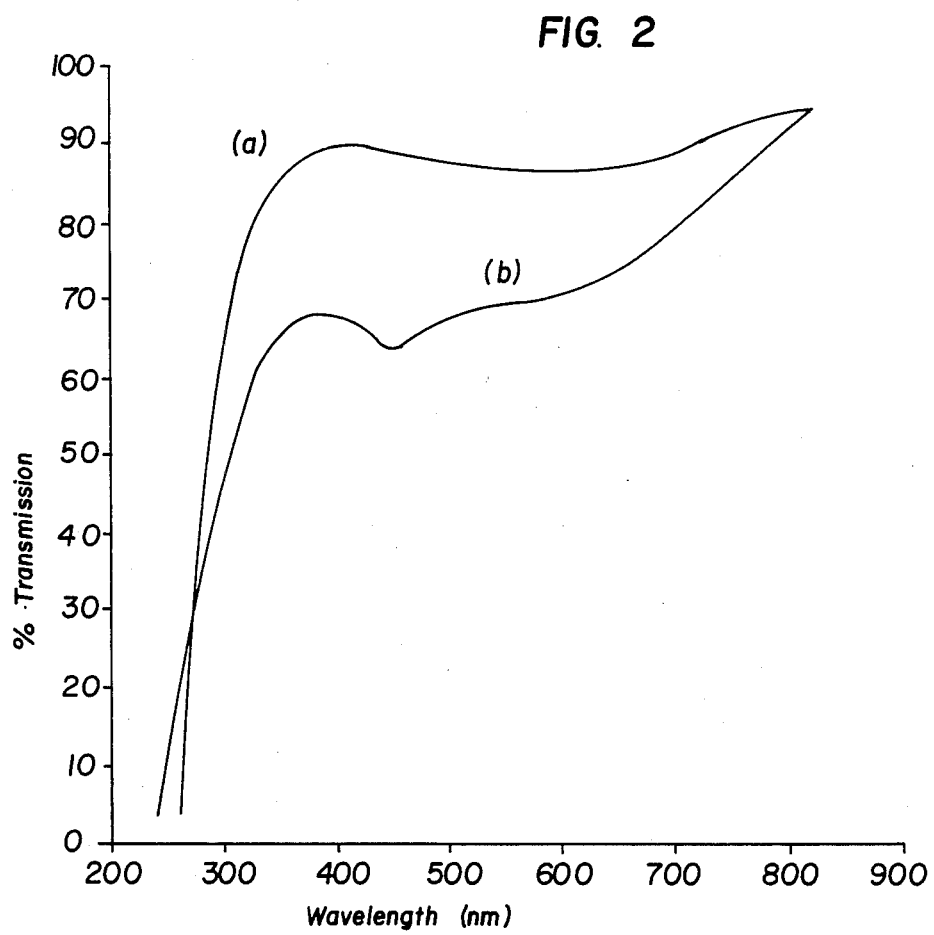
FIG. 2 is a graph showing percent transmission of light vs. wavelength of light for initially transparent glass comparing the transparency of the glass before and after irradiation.

Turning to FIGS. 2 and 3, a comparative test illustrates the coloration resistance of high water content glass according to the invention.

FIG. 2 shows, at curve (a), the transparency of percent transmission of light through a non-irradiated glass pane made with low water content (less than 0.5% by weight water) and having a composition $Na_2O.3SiO_2$. Curve (b) shows the percent transmission for such glass after it has been irradiated by gamma rays to a dosage of $10^6$ rad. The glass in both experiments was 0.5 mm thick.

It is apparent from FIG. 2 that substantial reduction in transparency has been caused by the coloration which in turn is caused by gamma ray irradiation.

FIG. 3 shows a corresponding experiment conducted with a similar $Na_2O.3SiO_2$ glass having a 2.2% by weight water content. The experimental glass pane used were again 0.5 mm thick. The irradiation was the same. It is noted there is substantially less difference between the before and after irradiation curves of FIG. 3 than FIG. 2. The specific water content of glass used in the experiment of FIG. 2 was 0.01% by weight water. It is known that transmission characteristics of glass change with time during and immediately after irradiation. For this reason, the experiment was conducted in such a way so as to measure the steady state condition of transparency in the glass. The measurements for transparency after irradiation were therefore conducted about 10 days after the actual irradiation during which time the specimens were kept in the dark and at room temperature.

While the exact mechanism for coloration resistance is not fully understood, a possible mechanism is that the water, in the high water content glass, combines with color centers, producing colorless SiOH. See for example, the Faile and Roy reference cited above.

While it is clear that such glass is particularly usable as windows in radiation shields or in radiation environments, it is also conceivable that such windows can be used in military aircraft or any other environment where a transparent window is necessary in a potentially or actual high radiation environment. Such radiation includes, for example, gamma rays and X-rays and generally, any electromagnetic radiation below wavelength $10^{-7}$, as well as $\beta$ (electron) radiation.

The high water content glass according to the invention can be prepared as follows:

1. Hydrothermal Method

Powdered glass and appropriate amounts of water are packed in a platinum tube and the tube closed by welding. The assembly is heated to 800° C. and at 2 Kbar pressure for 10 hours, in a hydrothermal unit. Subsequently the specimen is quickly cooled and taken out of the platinum tube.

2. Hydration Method

Glasses and water are placed in an autoclave and heated to about 200° C. for 3 to 100 hours at about 10 Kg/cm$^2$ pressure, allowing water to diffuse into the glass. This method is similar to the one used in U.S. Pat. Nos. 4,026,692; 3,365,315; 3,498,802 and 3,811,853.

3. Drying of Water Glass (Soluble Silicate) Method

Commercially available water glass (soluble silicate) can be slowly dried until it becomes a solid. This is similar to the method employed by Y. Moriya et al. in *Rep. Gov. Ind. Res. Inst.*, Osaka 39 [1] 1 (1979).

Experiments were conducted to verify the coloration resistance of various types of glass having various water contents all above about 0.5% by weight water, and preferably above 2.0% by weight water. The results are as follows.

RADIATION EXPERIMENTS

1. $Na_2O.3SiO_2$ Glasses

Such glasses with 0.49, 1.25, 2.55, 4.00, 5.80, 7.69, 9.04, 11.23 wt. % water respectively, were irradiated with $^{60}Co$ $\gamma$-ray at a dosage of $5\times10^7$ rad.

Such glasses with 1.08 and 2.30 wt. % water were also irradiated with $^{60}Co$ $\gamma$-ray at $5\times10^6$ rad. These glasses with 2.17, 6.16 wt. % water were irradiated with $^{60}Co$ $\gamma$-ray $1\times10^6$ rad.

Results: All glasses remained transparent.

2. $Na_2O.3SiO_2+3$ mole % $Al_2O_3$ Glasses

Such glasses with 0.85, 4.8 wt. % water were irradiated with $^{60}Co$ $\gamma$-ray $5\times10^6$ rad. Also glasses with 1.15, 6.39 wt. % water were irradiated with $^{60}Co$ $\gamma$-ray $1\times10^6$ rad.

Results: Again all glasses remained transparent.

3. Comparison Tests $Na_2O.3SiO_2$ glass with less then 0.5 weight percent water became dark green/brown upon irradiation with $^{60}Co$ $\gamma$-ray at $10^6$ rad or $5\times10^7$ rad.

In addition, it is well known that all commercial glasses, with the exception of non-browning glass containing $CeO_2$, become colored upon irradiation of $\gamma$-ray of comparable dosage or X-ray.

Accordingly, a preferred range of water content is between about 0.5 to 12% by weight water. The radiation levels are sufficiently high to cause coloration and browning in cerium oxide free glass having less than about 0.5% water content, and preferably electromagnetic radiation having a wavelength below about $10^{-7}$ cm as well as $\beta$ (electron) radiation and sufficient to supply a dosage of above about $10^5$ rad, to the glass.

While specific embodiments of the invention have been shown and described in detail to illustrate the application of the principles of the invention, it will be understood that the invention may be embodied otherwise without departing from such principles.

What is claimed is:

1. A method of resisting coloration of transparent glass and maintaining its transparency in a radiation environment comprising:

providing a cerium oxide free transparent $Na_2O.3SiO_2$ glass having a material content and composition including between about 0.5% and 12.0% by weight water;

positioning the glass in an environment of gamma radiation sufficient to supply a dosage of $10^5$ rad; and irradiating the glass so that it receives a dosage of the radiation of about $10^5$ rad by maintaining the glass in the environment of radiation with the glass undergoing substantially no color change upon irradiation and remaining substantially transparent, where the glass would undergo coloration if the 0.5% to 12.0% water were not present.

* * * * *